United States Patent [19]
Saxe

[11] Patent Number: 5,636,346
[45] Date of Patent: Jun. 3, 1997

[54] METHOD AND SYSTEM FOR SELECTIVELY TARGETING ADVERTISEMENTS AND PROGRAMMING

[75] Inventor: Andrew N. G. Saxe, New York, N.Y.

[73] Assignee: The Electronic Address, Inc., New York, N.Y.

[21] Appl. No.: 239,727

[22] Filed: May 9, 1994

[51] Int. Cl.$^6$ .................................................. H04N 7/10
[52] U.S. Cl. ................................. 395/201; 380/4; 348/1; 455/2
[58] Field of Search .................................. 364/401, 402, 364/408; 455/2; 348/1; 380/4

[56] References Cited

U.S. PATENT DOCUMENTS

| | | | |
|---|---|---|---|
| 5,155,591 | 10/1992 | Wachob | 455/2 |
| 5,515,098 | 5/1996 | Carles | 348/8 |

OTHER PUBLICATIONS

Database Services: Computerizing your Marketing Efforts, Nina Bondarook–Belofsky, Cable Television Business, v27, n18, p4(1) Sep. 15, 1990.
American Banker, v157, n1337, p4(1) Jul. 17, 1992.

*Primary Examiner*—Gail O. Hayes
*Assistant Examiner*—Krishna V. Kalidindi
*Attorney, Agent, or Firm*—Morey B. Wildes; Cowan, Liebowitz & Latman, P.C.

[57] ABSTRACT

A method and system for selectively targeting advertisements and programming to different demographically and specially targeted television audiences by relating carrier subscriber data to other proprietary marketing databases by creating, compiling and updating a National Directory of cable and other carrier system subscriber names and address information derived from actual cable system and telephone company billing records; providing proprietary software to participating carrier systems to allow them to modify the subscriber records in a uniform fashion at the carrier system level using unique electronic address designations, by encoding the subscriber information into encoded binary streams using proprietary binary conversion rules and binary signatures assigned to the carrier systems, and changing the conversion rules, signatures and their carrier designations for security on a monthly basis when the National Directory is updated; licensing the Directory to qualified data processing companies or their clients, each of which will receive proprietary software allowing it first to encode its own client's database and/or modeled target audience profiles into encoded binary streams using other proprietary binary conversion rules and binary signatures, and then to match the client's database or audience profiles to the Directory, while still maintaining subscriber privacy; and "matching" the Directory to the client's database or to specific audience parameters, characteristics and profiles desired by the marketers, using the encoded binary streams and proprietary software, in a manner that does not reveal the subscriber name, address or other identifying information and in a manner that cannot be reverse-engineered.

28 Claims, 4 Drawing Sheets

METHOD AND SYSTEM FOR SELECTIVELY TARGETING ADVERTISEMENTS AND PROGRAMMING

BACKGROUND OF THE INVENTION

This invention relates to advanced audience targeting systems for the advertising and direct marketing industries. More particularly, this invention relates to a unique process of directing different commercial messages, advertisements and programming to different demographically and selectively targeted television audiences by relating carrier subscriber data to other proprietary marketing databases. Still more particularly, this invention relates to the interests of the cable television and the newly emerging telecommunications industries that are involved in creating an electronic highway for video, voice and data, and in providing for a new common carrier that is superior to existing telephone, postal carrier and traditional broadcast networks in terms of forging one-to-one relationships between advertisers and customers, allowing interactive communications between advertisers and consumers, and efficiently integrating marketing tactics within a single new medium. In addition, this invention relates to the provision of proprietary security mechanisms to facilitate communication with carrier subscribers, which communication is restricted both by government policy (federal and local) and by consumer advocacy pressure aimed at protecting subscriber privacy, as well as by the carriers' own insistence on safeguarding their commercially valuable subscriber lists.

Currently, the cable television infrastructure is composed of geographically scattered and unconnected individual cable systems. This system makes it difficult for advertisers and direct marketers to plan and execute marketing using this infrastructure on a regional or national basis. In addition, the level of targeting available in cable television today is only modestly superior to the level of targeting produced by traditional national television networks. However, rapidly changing technology is transforming the cable television industry from a group of passive, one-way, geographically-separate entertainment distribution systems into an interconnected grid of interactive communications networks. When this process is complete, traditional multi-system cable operators ("MSOs") and other telecommunication carrier companies will be able to offer to companies that market products and services unparalleled opportunities to target prime audience prospects more efficiently and to deliver their sales messages, advertisements and sponsored programming directly to those prospects that are the natural targets for the products and services of those companies. Such precision targeting cannot be fully exploited, however, until new technologies and mechanisms for cable system signal switching, addressability and interactivity are in place, first requiring substantial upgrading and rebuilding of the hardware infrastructure.

The present invention will supplement this rebuilding effort with new information management techniques and services. These new information management techniques and services, which currently do not exist within the cable television infrastructure, are essential to allowing the level of advanced audience targeting desired by advertisers, cable television and other telecommunications industries. By providing these new techniques and services, the present invention will enable MSOs, telemarketing companies, advertisers, programmers and direct marketers to perform such functions as: (1) identification of all customers regardless of carrier system affiliation in order to facilitate the aggregation of customer data across multiple cable systems and preferred audience targeting; (2) matching of marketing databases or audience profiles (demographics, lifestyle and viewing behavior) with appropriately targeted subscriber addresses; (3) addressing of specific commercials, advertising campaigns or programming directly to specific households; (4) forwarding of specific customer requests directly to the appropriate advertisers and direct marketers; and (5) accomplishing all the above while both protecting customer privacy and safeguarding the proprietary subscriber records and other marketing databases involved in these processes.

It is one object of the present invention to solve the problems inherent in the ability of advertisers and direct marketers to uniformly reach selected groups of scattered subscriber households within disjointed and unconnected cable systems and to thereby greatly facilitate their use as new, national micromarketing tools. It is another object of this invention, to ensure that, over time, full service networks of voice, video and data can function together as a new common carrier for advertising and direct marketing in a manner superior to that of the existing telephone, postal carrier and traditional broadcast networks. It is a further object of this invention to make possible for the cable industry a substantial increase in its share of advertising and direct marketing by providing services and techniques that facilitate greatly expanded sales revenue for cable system operators at all levels. Similarly, it is yet a further object of this invention to provide similar services to ensure that other telecommunications companies involved in building "the information highway" are able to maximize new advertising and direct marketing revenue.

SUMMARY OF THE INVENTION

These and other objects of the invention are accomplished in accordance with the principles of the invention, provisionally called The Electronic Address ("TEA$^{SM}$"), by (1) creating, compiling and updating a National Directory of cable and other carrier system subscriber names and address information derived from actual cable system and telephone company billing records; (2) providing proprietary software to participating carrier systems to allow modification of the subscriber records; (3) modifying the subscriber records in a uniform fashion at the carrier system level using unique electronic address designations by encoding the subscriber information into encoded binary streams using proprietary binary conversion rules and binary signatures assigned to the carrier systems, and changing the conversion rules, signatures and their carrier designations for security on a monthly basis when the National Directory is updated; (4) licensing the Directory to qualified data processing companies or their clients, each of which will receive proprietary software allowing it first to encode its own client's database and/or modeled target audience profiles into encoded binary streams using other proprietary binary conversion rules and binary signatures, and then to match the client's database or audience profiles to the Directory, while still maintaining subscriber privacy; and (5) "matching" the Directory to the client's database or to specific audience parameters, characteristics and profiles desired by the marketers, using the encoded binary streams and proprietary software, in a manner that does not reveal the subscriber name, address or other identifying information and in a manner that cannot be reverse-engineered. In order to implement a planned advertising "buy" on cable, the marketer's advertising agency uses a TEA licensee to provide the TEA operations center with details of the subscriber coverage required by the campaign, and, by matching these details with the TEA Directory, the TEA operations center then identifies, with a unique "buy number," the target subscriber list that results from the match. When a cable system receives from an advertising agency, advertiser or licensee a media purchase order identified by the buy number, the cable system distributes the appropriate advertising messages to the subscribers of that cable system as designated in the "buy" by using proprietary software that decodes the subscribers' binary streams and derives the subscribers' actual cable account information. Thus, the marketer is able to directly access the targeted subscribers with the intended programming but is unable to obtain the targeted subscribers' actual addresses and information. With interactive systems, each cable subscriber also has a privacy option of refusing to share his name and other information with the advertiser. In addition, all cable systems and other carriers associated with TEA are assigned an identifying number that authorizes access to the TEA operations center.

The National Directory is also equipped with other security to ensure complete protection of consumer privacy. For example, in addition to the encoding of subscriber data, the buy number identifying a particular target subscriber list is encrypted in such a way that it cannot be discovered by outside entities when it is transferred to the cable system. In addition, an independent agency will be selected to monitor TEA's security processes and will be directed by a governing board to include representatives of industry trade associations and highly regarded individuals representing government, education and the private sector. Furthermore, once fully interactive systems are in place, other embodiments of the present invention will also be used to provide additional services as outgrowths of its primary advertising/direct marketing activity. Rather than just serving as a cable system telephone company subscriber address database, the TEA Directory and system could also function to (a) directly fulfill subscriber requests for additional information from advertisers, networks and local systems; (b) facilitate cooperative cable system and telephone company marketing while securing the proprietary nature of individual operator databases; (c) provide instant polling tallies for news or political organizations or for national or local elections; or (d) provide instant and actual, rather than estimated, program and commercial delivery data and ratings; or any combination thereof.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE INVENTION

Figure 1:
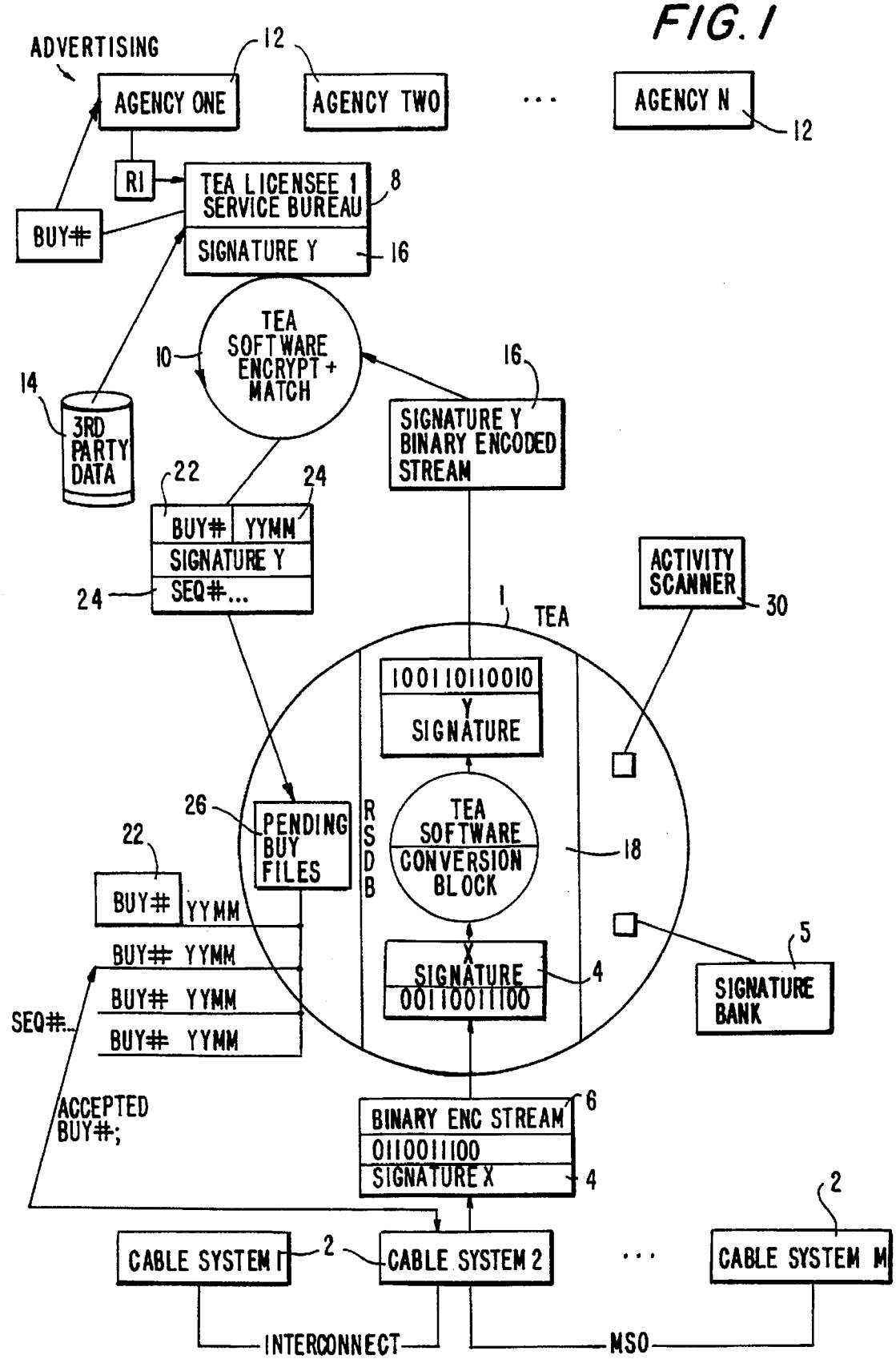
FIG. 1 is a block diagram of the overall system of the present invention.

The system of the present invention, provisionally entitled THE ELECTRONIC ADDRESS ("TEA$^{SM}$"), is to be a national telecommunications marketing system or service bureau, initially serving advertisers, direct marketers and the cable industry, and, later, other telecommunications industries. The TEA system should preferably be funded at least in part by a consortium of MSOs, major national advertisers and individual investors, and should preferably be operated as an independent public company. TEA implements a process to enable qualified data processors to create targeted advertising "buys" for their clients by matching encrypted cable subscriber data stored in a national TEA Directory to other marketing databases, in order to compile a list of specific individual cable subscribers or households that meet the desired criteria or parameters for the advertisement of the particular product or service provided by the client. TEA owns proprietary hardware and software that will implement this process and has household specific data encryption capabilities.

The TEA National Directory aggregates and updates key cable subscriber billing data (i.e., names, addresses and, potentially, other information) from multiple and fragmented cable systems and MSOs, and allows licensees to match this information with third party data sources, proprietary surveys and other marketing databases. The subscriber data is aggregated into the TEA system from among the many cable systems and includes subscriber names and addresses, subscriber cable account numbers and cable system identification numbers. As the TEA Directory is compiled, the data is encoded into binary streams using either a standardized electronic address or specific binary conversion rules or both, as discussed below. The encoding of data into the TEA directory allows for standardizing of subscriber data and thus for matching of advertiser data and/or target audience models with the TEA National Directory, and provides for security of subscriber information by facilitating the advertisements being sent directly to the matched subscribers, while not revealing any identifying subscriber data before, during or after the match is performed.

In encoding the TEA Directory information, TEA first uses specific proprietary software to assign a unique encoded identifier in the form of a standardized "electronic address" to each individual household cable subscriber record that is to be entered into the TEA Directory in order to standardize all subscriber records across the nation. These electronic addresses are in a standardized and uniform format, similar to an area code and telephone number, each having a cable system identification number, a geographical area identification number, a subscriber house account number, a subscriber customer identification number and an identifier for each television and/or individual in the cable subscriber home. The electronic address aids in directing the targeted advertisements to the subscribers that have been identified as the targeted households for a particular commercial message.

The TEA software also encodes the standardized and uniform electronic addresses into binary streams using a set of proprietary binary conversion rules. Alternatively, the ASCII data streams, i.e. the alphanumeric letters and digits of the information within the individual subscriber billing records, can be encoded directly into the binary streams using a different set of proprietary conversion rules. The proprietary binary conversion rules employ a statistical hash mechanism, such as disclosed in B. H. Bloom, *Space/Time Trade-offs in Hash Coding with Allowable Errors*, Communications of the ACM, Vol. 13, No. 7, July 1970, incorporated herein by reference. The use of this binary encoding system also precludes reverse engineering. The TEA software extraction method for multiple dwelling subscriber units (as opposed to single family dwelling units) further defines the binary conversion rules such that the binary streams representing the electronic addresses will result in the most accurate possible match at that address. The software can define N number of different conversion rules for N number of different address records in order to define the subscriber in as much detail as possible and thus result in a more detailed target audience.

Referring to FIG. 1, each cable system 2 is provided with software that defines a conversion rule specific to that cable system 2 for that specific TEA Directory update period. Each cable system is also provided with a unique corporate identification number and a unique digital signature 4 that are used to identify that system's binary conversion rule within the TEA system. The cable systems' conversion rules, corporate numbers and digital signatures change periodically (as often as monthly) as the TEA Directory is updated; these conversion rules and signatures, both those that are active and those that have been used in the past, are retained in a signature bank 5 in the TEA operations center 1. After encoding its subscriber information, each cable system 2 sends its corporate number and digital signature 4 to the TEA operations center 1 along with the binary encoded streams 6 of subscriber information that are to be entered into the TEA Directory, so that the TEA operations center 1 may verify the source of the information and so that the TEA operations center 1 will be able to determine the conversion rule that was used to encode the subscriber information and will thus be able to match that encoded information with encoded information from the advertiser. Later, the target subscriber addresses that are returned to the cable system 2 following a match will be in the binary code of that cable system; the proprietary software provided to the cable system 2 by TEA allows the cable system to then decode the encoded binary streams and facilitates sending the advertisement directly to the targeted subscribers. These binary conversion rules change regularly (at least monthly) and allow for counting of target subscribers before actual use of the list by an advertiser, post-advertisement verification of properly directed advertisements and programming.

Once the cable subscriber records have been altered and encoded in this manner, demographic, lifestyle and, ultimately, actual viewing behavior data can be appended to each subscriber record without identifying the actual subscriber's name and address. This would be done in order to facilitate precise geographic and demographic targeting of national and regional advertising campaigns, integrated multimedia campaigns, cross-system marketing and promotional campaigns, and the aggregation of settop polling data to generate precise cable viewer ratings.

TEA Directory information is encrypted in the manner described in order to protect subscriber privacy, so that data stolen from the TEA Directory or intercepted when being sent either from a cable system to compile the TEA Directory, to a licensee to perform a match or to a cable system for directing of an advertisement to subscribers cannot be read and the information contained within cannot be abused. Through the use of these special encryption techniques and various other security services that are monitored by an outside governing board, the TEA database security ensures complete protection of consumer privacy by preventing unauthorized access to the TEA Directory by outside entities. The process of TEA encoding and data encryption represents a complex technical undertaking, because precise engineering and software requirements must be carefully developed in parallel with participating MSOs in order to ensure interface and encryption capability and standardized data formats. In addition, the actual process of encryption/decryption will be seamless, user-friendly and easily accessible by the participating advertisers and agencies, cable systems and representative firms, regional interconnects, advertising traffic, service bureaus and delivery systems so that direct marketing using the TEA system and this invention can be facilitated.

After the information in the TEA Directory has been aggregated, standardized using unique electronic addresses and encoded using binary conversion rules, the TEA system is utilized to provide micromarketing and direct marketing for advertising agencies that desire to market their clients' products or services to a very specific group of individuals or households based on particular cable subscriber information. In order to facilitate the large number of processing requests that will be made by direct marketers and advertising entities, TEA may optionally license access to its Directory (for restricted purposes) only to qualified data processing companies. Typically, an advertising agency will use a TEA licensee to provide access to the TEA Directory, operations center and, thereby, to the details of the cable subscribers required for the advertising campaign. An advertising entity that itself has data processing capabilities can also be a TEA licensee and can thus bypass use of a separate service bureau. A company that licenses use of the TEA Directory will be required to pay either an annual license fee or a use fee. In return, the licensee will receive access to the TEA Directory and software that will allow it to binary encode its client's database or a modeled profile of its client's target audience and to match the Directory of TEA cable subscribing homes with its client's database or modeled audience profile.

The unique electronic address encoding and the proprietary binary conversion rules for encoding the TEA Directory information will be changed periodically (at least monthly) with every update of TEA's Directory so as to prevent the Directory from being used by a licensee beyond the term of its license. The licensees that qualify to use the TEA Directory, i.e., companies and advertisers using the TEA Directory for advertising and direct marketing, often called Service Bureaus, will be capable of enriching, and will be authorized to enrich, the information within the Directory through third party demographics sources, local surveys, pay-per-view subscribers (called "video on demand") information, home shopping transactions, viewer program ratings, data requests and other cable usage information.

Figure 2:
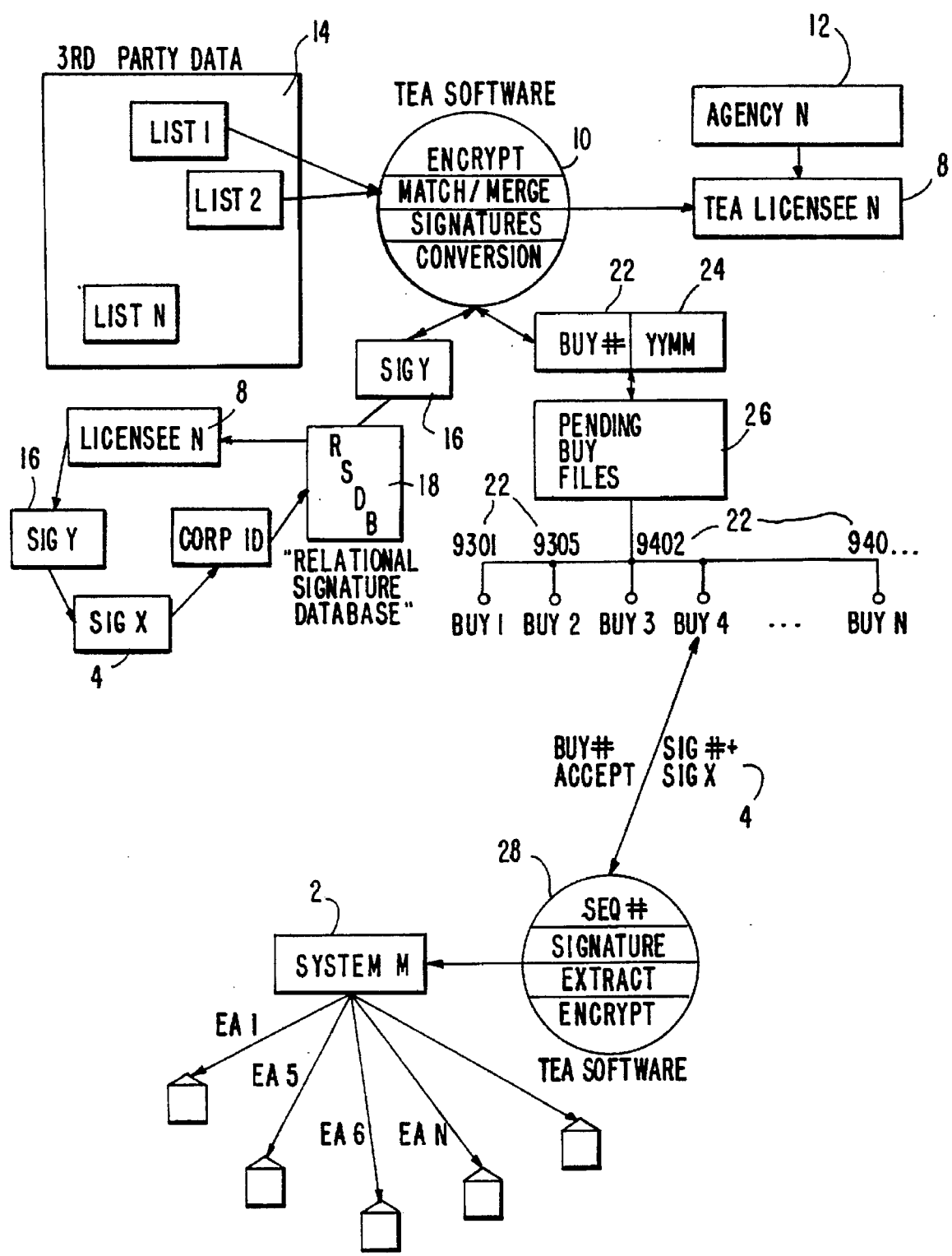
FIG. 2 is a block diagram of the process and relationship logic of the present invention.
Figure 3:
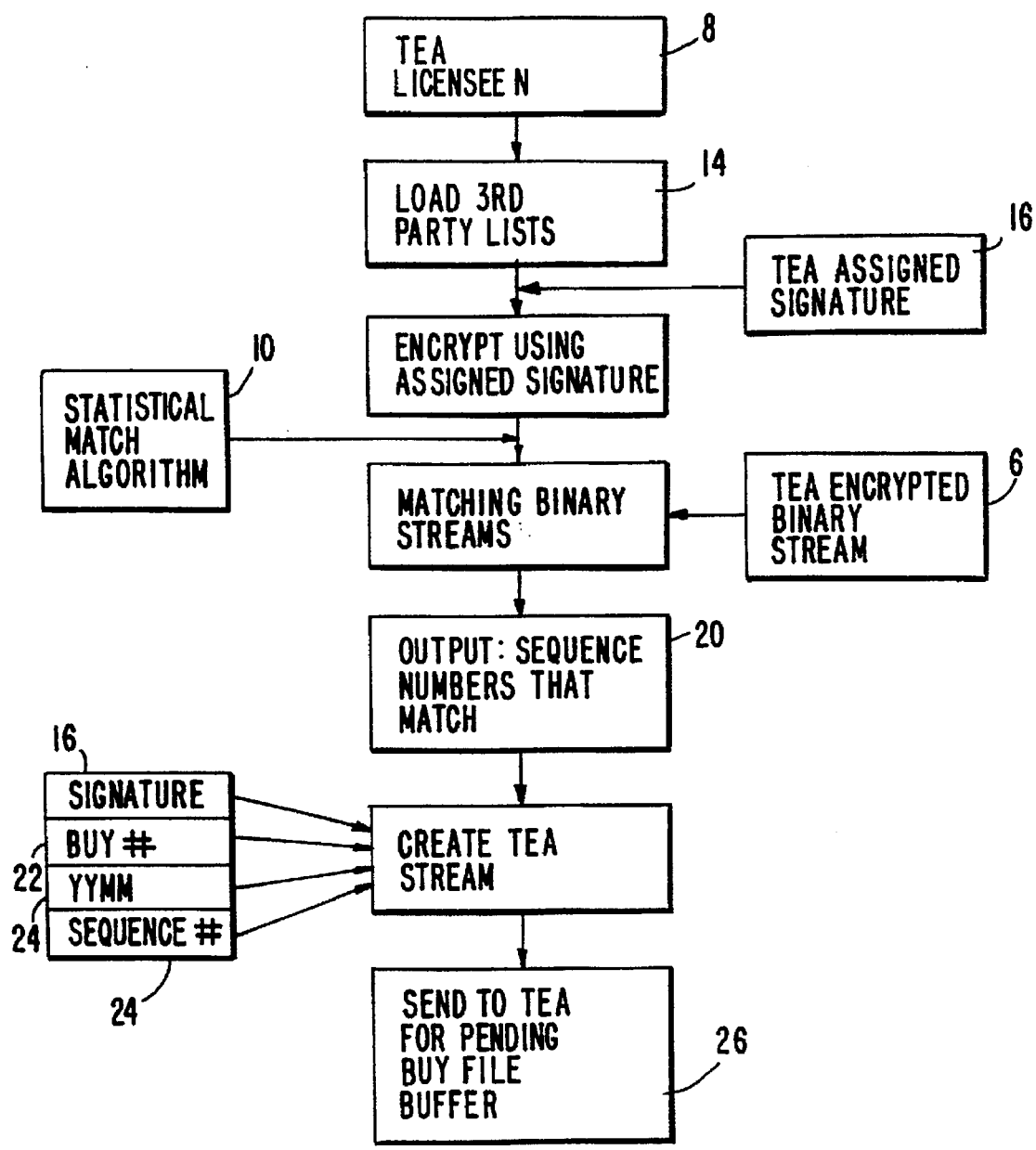
FIG. 3 is a block diagram of one embodiment of the encryption and matching process of the present invention.
Figure 4:
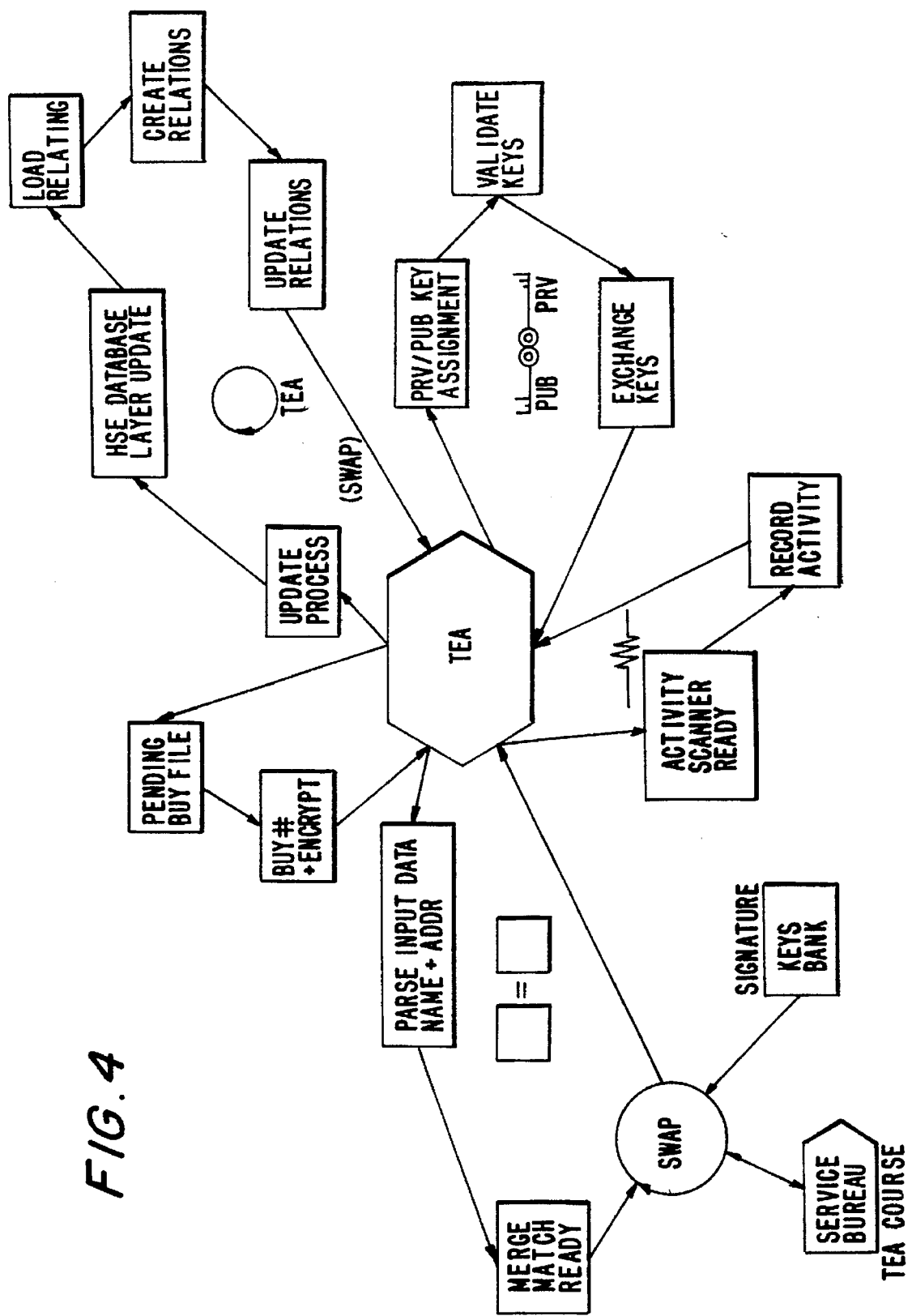
FIG. 4 is a block diagram of the flow and data management procedures of the system of the present invention.

In the typical situation involving an embodiment of this invention, as shown in FIGS. 1-3, the licensee 8 possesses proprietary software 10 that enables it to choose from the TEA Directory a specific audience to be targeted with an advertiser's commercial messages or programming. The advertising agency's client, the advertiser, first requests that the agency 12 advertise certain of the advertiser's products or services to a particular focused group of cable subscribers. Different advertiser requirements will dictate variations in the techniques used by the advertising agency 12, through a TEA service bureau or data processing licensee 8, to identify prospective customers from among the TEA Directory of cable subscribers. Generally, the ability to standardize addresses, match names and addresses, overlay third-party sources, perform geographic mapping functions and, in many cases, provide database modeling will be essential. In addition, data files containing cable system boundaries, street and business locations, and latitude/longitude coordinates will be required.

Identification of a prototype target audience might involve a multi-step process. In the first step, the advertising agency 12 defines the basic targeting needs of the client. For example, is the target restricted to a particular geographical area? Is the target to be existing customers only? Is the target to be potential customers only, based upon some preselected criteria such as demonstration and category of use? In the second step, the advertiser identifies the trading area of key retail and service providers where relevant. Where available, the advertisers would submit a current customer list with addresses or would purchase from third party data sources or from the key retail and service providers customer lists 14 for products or services that are so related to the product or service to be advertised such that the customers on those lists 14 would most likely be considered potential customers of the client. In addition, the advertisers could submit a profile of current customers so that a target audience profile can be formulated and so that the TEA database can be modeled to identify similar target prospects for the direct marketing. In the third step, after having identified the client's specific needs, the TEA licensee 8 prepares a blind "pre-buy" summary that allows the prospective client to evaluate and quantify the planned campaign. To prepare this pre-buy summary, the licensee 8 uses TEA software 10 to binary encode its third party data 14 and then to match this encoded data with the TEA Directory in order to identify the actual electronic addresses of cable subscribers to whom the particular advertising or programming is to be directed.

Encryption of a client's customer database is done using the same binary conversion rules that were used by the cable systems 2 to binary encode their cable subscriber information in creating or updating the TEA Directory. The TEA operations center 1 provides the TEA licensee 8 with digital signatures 16 to identify the conversion rules used by each cable system within the market areas encompassed by the client's customer database so that the licensee 8 may binary encode its client's customer data using those same conversion rules. However, TEA will not disclose to licensees 8 which conversion rules were used by which cable systems 2 to encode their data. Instead, in order to allow the cable systems 2 and the TEA licensees 8 to refer to the same binary conversion rules while preserving the confidentiality of the encoded data, TEA maintains a computerized database within the TEA operations center 1 called the Relational Signature Database ("RSDB") 18 in order to internally cross-reference the digital signatures 4 used by the cable systems during the different TEA Directory update periods and the digital signatures 16 used by the licensees 8 in encoding their databases. Then, TEA uses the corporate number of each cable system whose market areas encompass the customers on the client's customer database and, by cross-referencing the digital signature 4 used by each cable system during each of the different TEA Directory update periods with the signature information in the RSDB 18, derives the corresponding digital signatures 16 to be provided to the licensee 8 for use in binary encoding its client's database.

After the licensees have converted their own clients' data to a binary encoded format using TEA software, they will then match their files to the binary encoded streams in the TEA Directory, again using TEA software 10. This encryption technique continues to guarantee the privacy of the subscribers on the TEA Directory. After the match is completed, each TEA licensee 8 can provide its client with a target listing 20 of the cable systems to be targeted. The TEA licensee will first assign a "buy number" 22 associated with the potential cable advertising "buy," i.e., the result 20 of the match between the TEA Directory and the customer list or parameters given by the client. The licensee 8 will then pass the "pending buy" data 20 along to TEA, which will retain this data in its pending buy files 26 within the TEA operations center in the form of a sequence number 24 for each cable system according to the month and year (using the YYMM method for year/month) of the cable subscriber data supplied.

The TEA licensee 8 will communicate back to the client the pending buy file number 22 and a summary of the number of addresses to be targeted. This transmission of the pending buy number 22 could also involve encryption of the pending buy number using a traditional public/private key method or a session key method to ensure the privacy of the pending buy information 20. If the client decides to target advertise or direct market using the TEA pending buy, the advertiser will use that pending buy number during communications with its agency 12 (and/or cable representative firm) or the licensee 8, which will relay the file number to the actual cable systems upon making the "buy." Each pending buy file 26 will be accessible only by the cable entities with market regions that encompass subscribers whose electronic addresses are targeted within the pending buy 26. A cable system 2 will be unable to access an electronic address pending buy file 26 unless it has received a media insertion order referencing a TEA pending buy number 22 from the client or the advertising agency 12. Moreover, access to the TEA operations center 1 by each cable system 2 will be electronic, requiring an identifying PIN (personal identification number) or a digital signature in order to access a pending buy file with its specified electronic addresses. In addition, each buy number 22 and its corresponding pending buy file 26 remain encoded, requiring the cable system 2 to decode them with binary conversion rules using proprietary TEA decoding software 28. When a cable system 2 accesses the pending buy file using its PIN, the TEA software 28 will convert the encoded binary streams or electronic addresses 20 within the pending buy file 26 into traditional customer account numbers "on the fly" at the cable system 2. In turn, each cable operator's file of account numbers to be targeted will be directed by the cable operator's insertion ad server for household delivery based upon controller scheduling software. Proof of delivery of the advertisements or programming will be performed not by TEA but rather by the cable system's own scheduling log of homes and of messages delivered. By virtue of this system, advertisers and their clients can verify delivery of the directed advertisements and programming.

Once interactive cable systems are in place, viewers may interface with the cable medium in order to provide responses or interaction where appropriate. Responses from interactive programming/advertising will be captured on a file server, providing an account number associated with the buy file number that was originally provided, thus enabling advertiser response analysis. An interacting subscriber who desires privacy in his communications may opt only to receive advertiser information, i.e., to interact with the carrier without having his name, responses or other household-specific information revealed to the advertiser or programmer. Subscriber responses to TEA-placed advertisements are provided on-line or in batch mode to TEA. TEA then sends two lists to its licensees for fulfilment: one list of respondees to targeted advertisements (identified by a buy number) who desire product information fulfillment and a second list of respondees who desire only one-time information fulfillment with their privacy preserved.

Consumer and government concerns regarding privacy of information and security of data present a formidable barrier to the cable industry's ability to seize a large share of direct marketing revenue. Increased federal scrutiny of cable rates and tiering strategies may also pose special problems for the cable industry over the upcoming years. In addition, many existing cable franchise agreements prohibit the use of subscriber data for any purposes other than for billing or for service-related communications, thus preventing its use for outside direct marketing purposes. The various TEA Directory security processes would directly address all of these issues and would represent a preemptive move by the cable industry that could potentially eliminate new regulatory and public relations problems in the future. First, the TEA Directory security would virtually guarantee the security of subscriber data by effectively buffering information in such a way so that identifying subscriber data cannot be released to outside entities and, in effect, will always remain within the province of its respective MSO. In addition, encryption of TEA database information provides security against the release or proprietary subscriber data. The TEA system also provides reliable mechanisms to enable subscribers to voluntarily block the release to advertisers of household-specific information, similar to what is currently done by the telemarketing and direct mail industries. Furthermore, effective controls can be placed on the new interactive aspects of advertising by policing the electronic highway in order to prevent unwanted intrusions while still allowing adequate marketing information to reach consumers. Finally, an independent agency will be formed to oversee the TEA security systems and its related processes in order to provide additional assurances to Congress, the public and regulatory bodies that the proposed TEA service bureau could effectively self-regulate the industry's database. This agency should include, among others, highly regarded trade associations as well as individuals from government, education and the private sector.

As the cable industry evolves into a series of full-service and interactive communications networks, services ancillary to those originally contemplated by the TEA system may also be provided as an outgrowth of its primary Directory direct marketing management and electronic address encryption activities. For example, as interactive transaction-based requests for information, products or services are sent upstream to advertisers or producers by the subscribers of cable programming, the TEA system could direct fulfillment of certain types of subscriber requests. These requests may be from advertisers, networks and local systems, and may be for additional product information or for orders of products and/or services from the producers themselves. In addition, TEA would have in place all the necessary mechanisms to facilitate cross-system marketing while maintaining the proprietary nature of individual operator databases. The transitory nature of cable subscribers combined with the availability of new competition in the marketplace will make it increasingly difficult for MSOs not to cooperate in cross-system subscriber acquisition or retention marketing activity.

In addition to the components of the TEA system as discussed above (namely, the TEA Directory, the Signature Bank 5, the Relational Signature Database 18, the pending buy files 26, proprietary software 10, 28, etc.), the TEA system also includes an activity monitor to keep track of the TEA operations that are being performed throughout the TEA system and software. The TEA system could further provide instant ad hoc tallies for national polling for news and political organizations, and could function as the support center for national town hall meetings, and even, ultimately, as the polling place for referendums and elections on both a local and a national level. The polling capability of the TEA system can be expanded on an interactive level based upon new microprocessor television settop boxes to generate absolute program and commercial delivery data. Once instant electronic "ratings" and settop commercial decompression becomes viable, the standard estimated Nielsen ratings system will become obsolete, such that advertising can be purchased on a pay-for-actual-viewer-reached basis. The TEA system would make possible the aggregation of absolute delivered homes across all cable systems by interconnect or households in a particular buy in order to provide the detail necessary for advertising, post-buy and pay-per-actual-viewer analysis and invoicing. In such an environment, a targeted reach of advertising to 20,000 prime programming prospects would conceivably command a price greater than the price for reaching 200,000 total random viewers.

The following is a description of three different hypothetical scenarios, each describing the use of the TEA Directory and system to target advertisements using a licensee or an advertising agency on behalf of a product-producing or service-providing client, each of which is very different in the three examples. The three examples involve the direct marketing of a televideo service, of a major national credit card and of a national consumer good.

In the first example, a client that provides a televideo service, such as The Travel Channel, desires to launch in the Chicago region an a la carte programming service, i.e., a cable service from which subscribers may choose their particular programming and pay accordingly. Because The Travel Channel intends to send a 30-minute promotional video of its cable service to the subscribers that are its best prospective customers (a very costly promotion), identifying the most accurate target for its promotion is crucial. The advertising agency, through a TEA service bureau or data processing licensee, buys customer list information from sources whose products and services are so related to the product or service of its client, in this example The Travel Channel, such that the customers on those lists would have interests and characteristics matching those of that client's desired target audience and thus would be considered potential customers of that client. In this example, the TEA licensee on behalf of the ad agency purchases lists from Travel Magazine, Infobase and Behaviorbank, three companies whose lists will provide a more focused audience of consumers interested in travel-related services from which a target audience for The Travel Channel can be determined. These lists can be combined to eliminate duplicate listings and can be cross-referenced with a list from a credit-rating bureau to yield only those consumers with an annual income above a specified level. The names, addresses and any other relevant information of the consumers on the resulting prospective customer list are encoded using TEA proprietary binary conversion rules so that they can be matched with the TEA Directory of cable system binary encoded electronic addresses.

The TEA licensee maintains the binary encoded Directory of cable subscribers, including those in the Chicago region, where there are over one hundred cable systems. This information, in its encoded form, is then "blindly" matched with the prospective consumer list to yield a list, called the "recommended buy," of cable subscribers to be targeted in the intended promotion or advertisement. This list is held within the TEA system as a "pending buy" file with a specific file number that is used by the client for reference. If the client, The Travel Channel, decides to proceed with the planned promotion and to target the subscriber list in the pending buy file, the advertising or programming is sent to the cable subscribers that have been identified from within the TEA Directory as the natural targets for this promotion. The entire process is seamless to the client and agency, and is accomplished without revealing specific subscriber data to any other party involved and while protecting the proprietary nature of each cable company subscriber list.

In the second example, a client that provides a major national credit card, for example the American Express Company, desires to promote its credit card to potential cardholders in the Chicago area and, at the same time, to upgrade existing regular ("green") card subscribers to the premium ("gold" or "platinum") cards. The advertising agency, through the TEA licensee, requires different audience selection criteria for the targeted audiences of the different promotions. In order to generate a target audience profile, the advertising agency can generate an American Express cardholder profile using the list of American Express cardholders. Then, using the cardholder profile, the agency can locate non-cardholding individuals who are similar in many respects to the cardholders by cross-referencing or "matching" the cardholder profile with a list of consumers having generally similar characteristics. The names, addresses and relevant information of the consumers on the list of American Express cardholders and on the list of non-cardholding individuals having cardholder-type profiles remain encoded during the entire match process. The TEA licensee has access to the encoded TEA Directory and to the subset of subscribers in the Chicago region. The TEA licensee also has access to American Express' own data and information, and encodes that information using prescribed binary conversion software in order to facilitate matching with the TEA Directory. The TEA licensee blindly matches the list of cardholders and the list of non-cardholding individuals having cardholder-type profiles with the TEA list of cable subscribers in the Chicago region to yield two groups: one group of cable subscribers in the Chicago region who are American Express credit cardholders and who can be targeted specifically with premium credit card offers using a continuous series of advertisements regarding credit card upgrades, and a second group of cable subscribers in the Chicago region who are not cardholders but who meet the particular characteristics of cardholders with regard to, for example, income levels. Both of the groups are held in the TEA system as pending buys and each is identified by a specific file number. The advertising agency provides the findings to its client, American Express, for its consideration as to whether or not to place the "buy."

In the third example, a client that produces a national consumer good, for example the Duracell Battery Company, desires to advertise its battery products to heavy users of batteries. Because Duracell does not collect coupons used to purchase batteries or names of those who purchase batteries, it does not have a focused consumer audience with which to begin and thus must use an outside service for help in formulating a target audience for its cable advertisements. PRIZM, an organization that groups consumers and households according to socio-economic groups, is used for precision marketing in targeting users for consumer products. Using the PRIZM cluster system or any other equivalent consumer grouping system, the service bureau or advertising agency of Duracell identifies certain cluster groups as most likely to be heavy users of batteries. The service bureau then encodes the consumer data from the PRIZM cluster groups using the binary conversion rule chosen for Duracell and matches that encoded data with the encoded TEA database files in order to determine which cable subscribers fit the Duracell heavy battery user profile. The list of subscribers in each cable market with heavy battery use propensity is held within the TEA system as a pending buy. The service bureau then provides Duracell with the TEA pending buy file number and the associated findings. Duracell may then air one commercial the homes of subscribers who are heavy battery users and a different, coupon-offer commercial to the homes of subscribers who are not heavy battery users.

Thus, a system and method for selectively targeting information and advertisements is provided. One skilled in the art will appreciate that the present invention can be practiced by other than the described embodiments, which are presented for purposes of illustration and not limitation, and the present invention is limited only by the claims that follow.

What is claimed is:

1. A method for selectively targeting advertisements and programming and controlling signal message transmission to subscriber households while protecting the privacy of the subscriber information comprising the steps of:

creating a directory of electronic carrier system subscriber information in a computer system;

modifying the subscriber information within the directory by creating a unique electronic address designation for encoding the information of each subscriber;

encoding the subscriber information into binary streams within the directory using a first set of binary conversion rules, whereby each binary conversion rule from among said first set is different for each carrier such that encoded subscriber information can be read only by one with the proper binary conversion rule;

creating a database or a modeled profile of information for customers of an advertiser;

encoding the customer information into binary streams within the database or modeled profile using a second set of binary conversion rules, whereby each binary conversion rule from among said second set is different for each advertiser such that encoded customer or profile information can be read only by one with the proper binary conversion rule;

matching the binary stream subscriber information in said directory to the binary stream customer information within either in said database or in said modeled profile, whereby a target subscriber list is produced;

providing a set of control signals, one signal for each subscriber on said target subscriber list; and controlling, in response to said set of control signals, the transmission of commercial information and advertisements from the advertiser directly to the target subscribers, whereby only target subscribers from among said subscribers in said directory receive said commercial information and advertisements.

2. The method of claim 1 wherein said step of creating a directory comprises aggregating the subscriber information of a plurality of carrier systems into a central processing center.

3. The method of claim 2 wherein said step of creating a directory further comprises updating the aggregated subscriber information of a plurality of carrier systems in said central processing center.

4. The method of claim 1 wherein said step of modifying the subscriber information comprises arranging the subscriber information into a standardized, digital electronic address designation format.

5. The method of claim 4 wherein said standardized electronic address designation comprises a cable system identification number, a geographical area identification number, a subscriber house account number and a subscriber customer identification number.

6. The method of claim 1 wherein said step of modifying the subscriber information further comprises the step of changing the unique electronic address designation periodically.

7. The method of claim 1 wherein said step of creating a database of customer information comprises the step of aggregating the customer information of at least one third party source into a central processing center.

8. The method of claim 1 wherein said step of creating a database of customer information comprises aggregating lists of information of customers of an advertiser into a central processing center.

9. The method of claim 1 wherein said step of creating a modeled profile of customer information comprises the steps of:

aggregating the customer information of at least one third party source into a central processing center;

sorting the aggregated customer information according to consumer information categories;

determining a range for the aggregated customer information within each category; and forming a customer information profile comprising at least one customer information category, wherein each customer information category comprises a range of information.

10. The method of claim 1 wherein said step of matching comprises the steps of:

comparing the binary streams of the encoded subscriber information within the directory either to the binary streams of the encoded customer information of the database or to the binary streams of the encoded customer information of the modeled profile; and composing a subset of encoded subscriber information for which any of the binary streams of such encoded subscriber information match any of the binary streams of customer information within either the database or the modeled profile.

11. The method of claim 10 wherein said step of matching further comprises using said first set of binary conversion rules to produce from the subset of encoded subscriber information a target subscriber list comprising the electronic address designations for the subscriber information within the subset of encoded subscriber information for which the binary streams of such subscriber information matched any of the binary streams of customer information within either the database or the modeled profile.

12. The method of claim 11 wherein said step of controlling further comprises the steps of:

converting the electronic address designation for each subscriber within the target subscriber list into a traditional customer account number;

downloading the traditional account number of each subscriber within the target subscriber list to the respective carrier system of that subscriber;

transmitting the commercial information and advertisements to the respective carrier system of each subscriber within the target subscriber list; and arranging for the transmission at the carrier system level of the commercial information and advertisements to each subscriber within the target subscriber list according to the traditional account number of each said subscriber.

13. The method of claim 1 further comprising the optional step of licensing access to the directory to one or more licensees prior to said step of matching the directory such that said step of matching the directory can be performed only by a licensee having access to the directory.

14. The method of claim 1 wherein the binary conversion rules within said first and second sets of binary conversion rules are identical.

15. A computer program product for controlling a computer for selectively targeting advertisements and programming and controlling signal message transmission to subscriber households while protecting the privacy of the subscriber information, said program product comprising:

a recording medium readable by the computer;

means recorded on said recording medium for creating a directory of electronic carrier system subscriber information in said computer;

means recorded on said recording medium for modifying the subscriber information within the directory by creating a unique electronic address designation for encoding the information of each subscriber;

means recorded on said recording medium for encoding the subscriber information into binary streams within the directory using a first set of binary conversion rules, whereby each binary conversion rule from among said first set is different for each carrier such that encoded subscriber information can be read only by one with the proper binary conversion rule;

means recorded on said recording medium for creating a database or a modeled profile of information for customers of an advertiser;

means recorded on said recording medium for encoding the customer information into binary streams within the database or modeled profile using a second set of binary conversion rules, whereby each binary conversion rule from among said second set is different for each advertiser such that encoded customer or profile information can be read only by one with the proper binary conversion rule;

means recorded on said recording medium for matching the binary stream subscriber information in said directory to the binary stream customer information either in said database or in said modeled profile, whereby a target subscriber list is produced;

means for providing a set of control signals, one signal for each subscriber on said target subscriber list; and means recorded on said recording medium for controlling, in response to said set of control signals, the transmission of commercial information and advertisements from the advertiser directly to the target subscribers whereby only target subscribers from among said subscribers in said directory receive said commercial information and advertisements.

16. The computer program product of claim 15 wherein said means for creating a directory comprises means for aggregating the subscriber information of a plurality of carrier systems into a central processing center.

17. The computer program product of claim 16 wherein said means for creating a directory further comprises means for updating the aggregated subscriber information of a plurality of carrier systems in said central processing center.

18. The computer program product of claim 15 wherein said means for modifying the subscriber information comprises means for arranging the subscriber information into a standardized, digital electronic address designation format.

19. The computer program product of claim 15 wherein said standardized electronic address designation comprises a cable system identification number, a geographical area identification number, a subscriber house account number and a subscriber customer identification number.

20. The computer program product of claim 15 wherein said means for modifying the subscriber information further comprises means for changing the unique electronic address designation periodically.

21. The computer program product of claim 15 wherein said means for creating a database of customer information comprises means for aggregating the customer information of at least one third party source into a central processing center.

22. The computer program product of claim 15 wherein said means for creating a database of customer information comprises means for aggregating lists of information of customers of an advertiser into a central processing center.

23. The computer program product of claim 15 wherein said means for creating a modeled profile of customer information comprises:

means for aggregating the customer information of at least one third party source into a central processing area;

means for sorting the aggregated customer information according to consumer information categories;

means for determining a range for the aggregated customer information within each category; and means for forming a customer information profile comprising at least one customer information category, wherein each customer information category comprises a range of information.

24. The computer program product of claim 15 wherein said means for matching comprises:

means for comparing the binary streams of the encoded subscriber information within the directory either to the binary streams of the encoded customer information of the database or to the binary streams of the encoded customer information of the modeled profile; and means for composing a subset of encoded subscriber information for which any of the binary streams of such encoded subscriber information matches any of the binary streams of customer information within either the database or the modeled profile.

25. The computer program product of claim 24 wherein said means for matching further comprises means for using said first set of binary conversion rules to produce from the subset of encoded subscriber information a target subscriber list comprising the electronic address designations for the subscriber information within the subset of encoded subscriber information for which any of the binary streams of such subscriber information matched any of the binary streams of customer information within either the database or the modeled profile.

26. The computer program product of claim 25 wherein said means for controlling further comprises:

means for converting the electronic address designation for each subscriber within the target subscriber list into a traditional customer account number;

means for downloading the traditional account number of each subscriber within the target subscriber list to the respective carrier system of that subscriber;

means for transmitting the commercial information and advertisements to the respective carrier system of each subscriber within the target subscriber list; and means for arranging for the transmission at the carrier system level of the commercial information and advertisements to each subscriber within the target subscriber list according to the traditional account number of each said subscriber.

27. The computer program product of claim 15 further comprising the means for licensing access to the directory such that said means for matching the directory can be employed only by a licensee having access to the directory.

28. The computer program product of claim 15 wherein the binary conversion rules within said first and second sets of binary conversion rules are identical.

\* \* \* \* \*